(12) United States Patent
Santos et al.

(10) Patent No.: US 12,023,865 B2
(45) Date of Patent: Jul. 2, 2024

(54) LIGHT ENGINES FOR VAT POLYMERIZATION 3D PRINTERS

(71) Applicant: Nexa3D Inc., Ventura, CA (US)

(72) Inventors: Francisco Santos, Ventura, CA (US); Steven Ulrich, Santa Barbara, CA (US); Izhar Medalsy, Ventura, CA (US)

(73) Assignee: NEXA3D INC., Ventura, CA (US)

( * ) Notice: Subject to any disclaimer, the term of this patent is extended or adjusted under 35 U.S.C. 154(b) by 148 days.

(21) Appl. No.: 17/819,160

(22) Filed: Aug. 11, 2022

(65) Prior Publication Data

US 2024/0051227 A1 Feb. 15, 2024

(51) Int. Cl.
*B29C 64/282* (2017.01)
*B29C 64/129* (2017.01)
(Continued)

(52) U.S. Cl.
CPC .......... *B29C 64/282* (2017.08); *B29C 64/129* (2017.08); *B29C 64/286* (2017.08); *B33Y 30/00* (2014.12)

(58) Field of Classification Search
CPC .... B29C 64/277; B29C 64/282; B29C 64/286
See application file for complete search history.

(56) References Cited

U.S. PATENT DOCUMENTS

| 4,575,330 A | 3/1986 | Hull |
| 5,122,441 A | 6/1992 | Lawton et al. |

(Continued)

FOREIGN PATENT DOCUMENTS

| CN | 103890639 A | 6/2014 |
| CN | 203766034 U | 8/2014 |

(Continued)

OTHER PUBLICATIONS

International Search Report and Written Opinion mailed Feb. 6, 2017, from the European Patent Office, for International Patent Application No. PCT/IT2016/000225 (filed Oct. 3, 2016), 9 pgs.

(Continued)

*Primary Examiner* — Atul P. Khare
(74) *Attorney, Agent, or Firm* — Ascenda Law Group, PC

(57) ABSTRACT

A light engine for a three-dimensional printer includes a plurality of light emitting diodes (LEDs) arranged into respective groups, each respective group of LEDs including one or more LEDs, e.g., LEDs of different wavelengths. Corresponding to each respective LED group is a respective light pipe for receiving outputs of radiation from each the LEDs of the respective group and providing an output of the light pipe, and a respective telecentric optical system for collimating the output of the respective light pipe to provide a collimated output of the respective LED group. The respective telecentric optical system of each LED group includes a plurality of lenses, an absorber for constraining high angle rays of electromagnetic radiation propagating from the respective light pipe, and a crosstalk filter arranged to prevent rays of electromagnetic radiation propagating between adjacent ones of the light pipes of the light engine through the telecentric optical system.

20 Claims, 11 Drawing Sheets

Light Engine 32

(51) Int. Cl.
B29C 64/286 (2017.01)
B33Y 30/00 (2015.01)

(56) References Cited

U.S. PATENT DOCUMENTS

| | | |
|---|---|---|
| 5,391,072 A | 2/1995 | Lawton et al. |
| 5,476,749 A | 12/1995 | Steinmann et al. |
| 8,663,539 B1 | 3/2014 | Kolodziejska et al. |
| D734,788 S | 7/2015 | Reches et al. |
| D777,251 S | 1/2017 | Stand |
| 10,328,634 B2 | 6/2019 | Zitelli et al. |
| 11,090,866 B2 * | 8/2021 | Sohn ................ B23K 26/0608 |
| 2009/0002669 A1 | 1/2009 | Liu et al. |
| 2015/0072293 A1 | 3/2015 | Desimone et al. |
| 2015/0145171 A1 | 5/2015 | Walker et al. |
| 2015/0290876 A1 | 10/2015 | Liu et al. |
| 2015/0352788 A1 | 12/2015 | Livingston et al. |
| 2016/0046072 A1 | 2/2016 | Rolland et al. |
| 2016/0046075 A1 | 2/2016 | Desimone et al. |
| 2016/0046080 A1 | 2/2016 | Thomas et al. |
| 2016/0052205 A1 | 2/2016 | Frantzdale |
| 2016/0082655 A1 | 3/2016 | Castanon et al. |
| 2016/0129645 A1 | 5/2016 | Wighton et al. |
| 2016/0136890 A1 | 5/2016 | Castanon et al. |
| 2016/0193786 A1 | 7/2016 | Moore et al. |
| 2016/0200052 A1 | 7/2016 | Moore et al. |
| 2016/0229123 A1 | 8/2016 | Carlson et al. |
| 2016/0263837 A1 | 9/2016 | Goldman et al. |
| 2016/0288376 A1 | 10/2016 | Sun et al. |
| 2016/0303793 A1 | 10/2016 | Ermoshkin et al. |
| 2016/0311158 A1 | 10/2016 | Desimone et al. |
| 2016/0325493 A1 | 11/2016 | Desimone et al. |
| 2016/0369096 A1 | 12/2016 | Rolland et al. |
| 2017/0129167 A1 | 5/2017 | Castanon |
| 2017/0129175 A1 | 5/2017 | Zitelli et al. |
| 2018/0036941 A1 | 2/2018 | Xu et al. |
| 2020/0055251 A1 * | 2/2020 | Medalsy ............... B29C 64/393 |

FOREIGN PATENT DOCUMENTS

| | | |
|---|---|---|
| CN | 104669621 A | 6/2015 |
| CN | 106 827 509 A | 6/2017 |
| EP | 171069 A2 | 2/1986 |
| EP | 484086 A1 | 5/1992 |
| EP | 506616 A1 | 9/1992 |
| EP | 2226683 A1 | 9/2010 |
| ES | 2588485 T3 | 11/2016 |
| HK | 1215475 A1 | 8/2016 |
| KR | 102199897 B1 * | 1/2021 ............ B33Y 50/02 |
| WO | 2012021940 A1 | 2/2012 |
| WO | 2015107066 A1 | 7/2015 |
| WO | 2016010946 A1 | 1/2016 |
| WO | 2016081410 A1 | 5/2016 |
| WO | 2016109550 A1 | 7/2016 |
| WO | 2016123499 A1 | 8/2016 |
| WO | 2016123506 A1 | 8/2016 |
| WO | 2016126796 A2 | 8/2016 |
| WO | 2016133759 A1 | 8/2016 |
| WO | 2016140886 A1 | 9/2016 |
| WO | 2016140888 A1 | 9/2016 |
| WO | 2016140891 A1 | 9/2016 |
| WO | 2016145050 A1 | 9/2016 |
| WO | 2016145182 A1 | 9/2016 |
| WO | 2016149097 A1 | 9/2016 |
| WO | 2016149104 A1 | 9/2016 |
| WO | 2016149151 A1 | 9/2016 |
| WO | 2016126796 A3 | 10/2016 |
| WO | 2016172784 A1 | 11/2016 |
| WO | 2016172788 A1 | 11/2016 |
| WO | 2016172804 A1 | 11/2016 |
| WO | 2016172805 A1 | 11/2016 |
| WO | 2017045995 A1 | 3/2017 |
| WO | 2017056124 A1 | 4/2017 |
| WO | 2017056124 A8 | 4/2017 |
| WO | 2018/140218 A1 | 8/2018 |

OTHER PUBLICATIONS

International Search Report and Written Opinion mailed May 4, 2018, from the ISA: European Patent Office, for International Patent Application No. PCT/US2018/015285 (filed Jan. 25, 2018), 13 pgs.
Vu; et al., "LED Uniform Illumination Using Double Linear Fresnel Lenses for Energy Saving", Energies (2017), 10 (2091):1-15.
Henry, Dr. William, "MicroLED Arrays Find Applications in the Very Small", Photonics Spectra (Mar. 2013), downloaded from: https://www.photonics.com/a53224/MicroLED_Arrays_Find_Applications_in_the_Very, 7 pages.
International Search Report and Written Opinion mailed May 24, 2018, from ISA—European Patent Office, for International Application No. PCT/US2018/012774 (filed Jan. 8, 2018), 13 pages.
International Search Report and Written Opinion mailed Nov. 20, 2023, from the ISA/European Patent Office, for International Patent Application No. PCT/US2023/029886 (filed Aug. 9, 2023), 14 pgs.

* cited by examiner

LIGHT ENGINES FOR VAT POLYMERIZATION 3D PRINTERS

FIELD OF THE INVENTION

The present invention relates to the field of three-dimensional ("3D") printing, commonly referred to as 3D printing, and in particular to light engines for use in 3D printing apparatus that rely on photo-curing of liquid polymers for the formation of three-dimensional objects.

BACKGROUND 3D printing by photo-curing of liquid resins generally involves exposing the liquid resin to electromagnetic radiation of ultra-violet (UV) wavelengths according to a pattern and building an object through such selective curing layer-by-layer, where each layer is a transverse section of the object under construction. In the so-called "bottom-up" method of such construction, a 3D model of the object is represented in computer software as an ordered succession of layers, and an extraction plate, on which is adhered a first layer of the polymer used to form the object, moves a predetermined distance as each layer of the object is formed through the selective irradiation of the liquid resin that is contained in a tank. The resin is exposed to the UV radiation through a mask, which in some cases is a liquid crystal display (LCD) panel. Basically, the layers are represented in computer software and are reproduced, pixel-by-pixel, as images on the LCD panel. As each image is displayed, light from the UV radiation source is projected through the LCD panel and into the tank where it acts to cure the liquid resin. Because the light is introduced into the tank according to the pattern of the image on the LCD panel, the curing of the resin occurs in that same pattern. To avoid the cured resin adhering to the bottom of the tank (or the mask, if no separate bottom is present), a flexible membrane is often introduced between the mask and the liquid resin. The flexibility of the membrane, and its composition, allows for ease of separation of the newly-cured resin when the extraction plate is raised in anticipation of printing the next layer.

Conventional LCD panels, including those used for masks in 3D printers, typically include polarizing films on each side of the panel. Referring, for example, to FIG. 1, in a conventional LCD panel 33, liquid crystals of a liquid crystal matrix 36 are sandwiched between layers 34, 35 of polarizing film. These polarizing films 34, 35 are needed in order for the panel to produce crisp images. Because they are polarizing, the films allow only light 38 (or, more generally, electromagnetic radiation) of certain polarization to pass. The polarizing films of a typical LCD panel are arranged so that the first film 34 (the one facing the backlight source 32) allows only light 38 of the desired polarization into the liquid crystal portion 36 of the panel. The second film 35 (the one at the output side of the panel) blocks any "extra" light 38, while allowing only the illuminated liquid crystals to display an image 39 through the panel (e.g., on a display panel 37). Absent the two polarizing films 34, 35 the image quality of a conventional LCD panel will likely be unacceptable, certainly for 3D printing applications, due to a poor contrast ratio.

Because the LCD panels used for 3D printers include polarizing films, not all of the light emitted by a backlight source will pass through the LCD panel. A significant portion of the energy due to the light from the backlight source incident upon the polarizing film of the LCD panel is thus converted to heat. This heat has several negative side effects, including shortening the usable life of the resin in the tank (which itself generates heat due to the exothermic nature of the curing reaction) and potentially shortening the useable life of the LCD panel itself. The presence of the polarizing films of the LCD panel also means the overall energy transfer efficiency from the backlight source to the liquid resin is reduced from what it otherwise might be. The need to eliminate heat generated due to the presence of the polarizing films of the LCD panel can lead to increased printing times, as time must be built into any print cycle to allow the panel to cool down, and increased size and weight of the printers due to the need to incorporate heat sinks and forced air or other cooling arrangements. Ultimately, the heat leads to increased operating costs for users of the 3D printer due to the need to replace LCD panels that become worn due to exposure to this heat.

SUMMARY OF THE INVENTION

Embodiments of the present invention address situations such as those noted above through the provision of a light engine which avoids the heat generation at LCD panels experienced in conventional 3D printers. In one embodiment, a light engine for a three-dimensional printer configured in accordance with the present invention includes a plurality of light emitting diodes (LEDs) arranged into respective groups of LEDs, where each respective group of LEDs includes one or more LEDs, and in some instances at least two LEDs of different wavelengths. Corresponding to each of the respective LED groups is (i) a respective light pipe (e.g., made of fused silica N-glass, poly(methyl methacrylate), or a transparent thermoplastic) for receiving (and homogenizing) outputs of radiation from each the LEDs of the respective group and providing an output of the light pipe, and (ii) a respective telecentric optical system for collimating the output of the respective light pipe to provide a collimated output of the respective LED group. The respective telecentric optical system of each LED group includes a plurality of lenses, an absorber, and a crosstalk filter. The absorber is configured to constrain high angle rays of electromagnetic radiation propagating from the respective light pipe. The crosstalk filter is arranged to prevent rays of electromagnetic radiation propagating from one or more adjacent light pipes of the light engine through the telecentric optical system associated with the respective light pipe. The respective LED groups, their respective light pipes, and respective telecentric optical systems are arranged in an array.

In some implementations of the present light engine, each respective group of LEDs includes four LEDs. Various implementations may have each respective group of LEDs including one or more LEDs that emit electromagnetic radiation at 405 nm, at 385 nm, or both. Further, in various implementations each LED group may have other numbers of LEDs at these and/or other wavelengths, for example wavelengths in the near ultra-violet, such as 365 nm. Preferably, though not necessarily, the four LEDs of each respective group of LEDs are independently operable to emit electromagnetic radiation. This allows for fine control of the intensity and frequency of light output of the light engine.

Embodiments of the present light engine also may include a polarizer. The polarizer may be positioned to receive the collimated output of the respective telecentric optical system of each respective LED group, or the polarizer may be positioned intermediate the plurality of lenses of each respective telecentric optical system of each respective LED group.

The absorber of each telecentric optical system of each respective LED group may have an adjustable numerical aperture. Alternatively, a variable aperture diameter may be present, for example through use of an adjustable iris.

The plurality of lenses of each telecentric optical system of each respective LED group may include three lenses, two of which form a lens doublet and the other one of which is a square lens. In some instances, instead of the square lens a lens array may be used. Or, in some embodiments a Fresnel lens may be used.

The present invention also includes an apparatus for forming three-dimensional objects by photo-curing a photo-curing liquid polymer by exposure to a radiation that includes a tank for containing the photo-curing liquid polymer, a mask, and a collimated light source to emit said radiation by which said photo-curing liquid polymer undergoes curing through a radiation-transparent opening in said tank, wherein the mask is positioned between the collimated light source and the photo-curing liquid polymer and the collimated light source is a light engine as described above. The mask may be an LCD panel configured to selectively transmit electromagnetic radiation from the collimated light source into the tank through the radiation-transparent opening in said tank. The LCD panel may include polarizing films on each side of the LCD panel, or a polarizing film on only one side of the LCD panel.

These and additional embodiments of the invention are described further below.

BRIEF DESCRIPTION OF THE DRAWINGS

The invention is now described, by way of example and without limiting the scope of the invention, with reference to the accompanying drawings which illustrate embodiments of it, in which.

DETAILED DESCRIPTION

Described herein are examples of light engines for use in 3D printing apparatus that rely on photo-curing of liquid polymer resins for the formation of 3D objects. Such printing apparatus generally include a photo-curing liquid polymer resin for the formation of the 3D objects contained within a tank or vat with a mask interposed between the base of the tank and the photo-curing liquid polymer resin. In some cases, an upper surface of the mask itself may be used as the base of the tank, at least in part. A light engine configured in accordance with an embodiment of the invention is used to illuminate the mask, which is preferably an LCD panel. Thus, the photo-curing liquid polymer resin is exposed to UV radiation from the light engine through the mask, and the 3D objects are formed, layer-by-layer as the photo-curing liquid polymer resin selectively cures in layers according to images reproduced, in pixelwise fashion, on the LCD panel. To avoid the cured resin adhering to the bottom of the tank (or the mask, if no separate bottom is present), a flexible membrane is introduced between the mask and the liquid resin.

Figure 1:
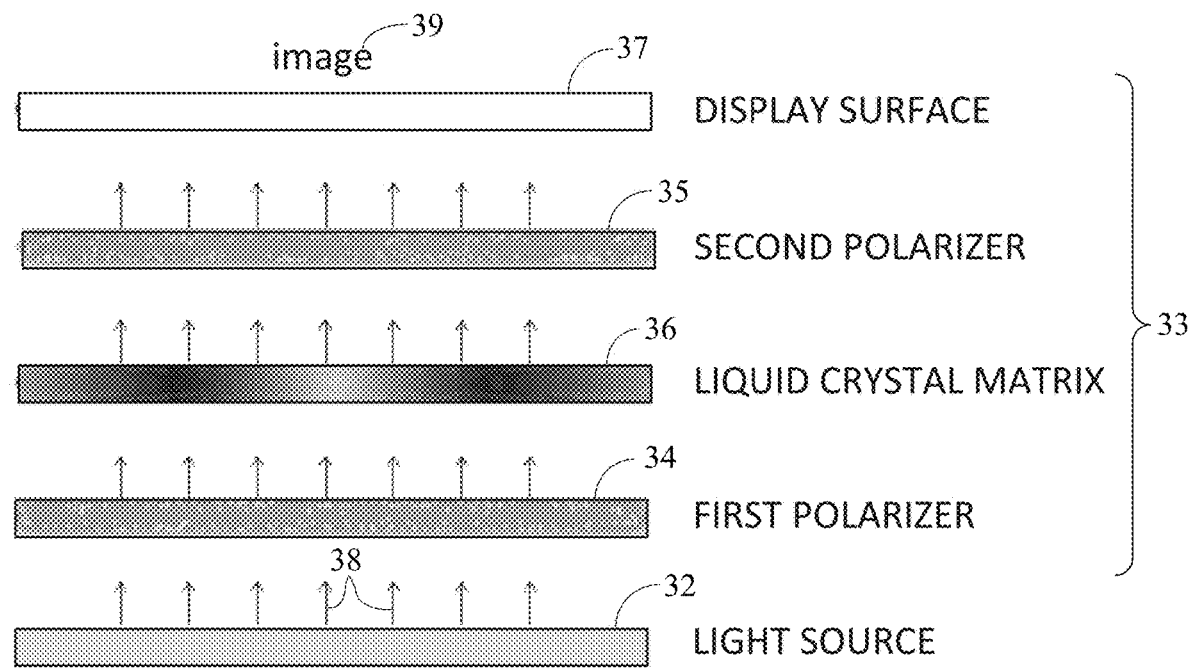
FIG. 1 shows an example of a conventional LCD panel.
Figure 2:
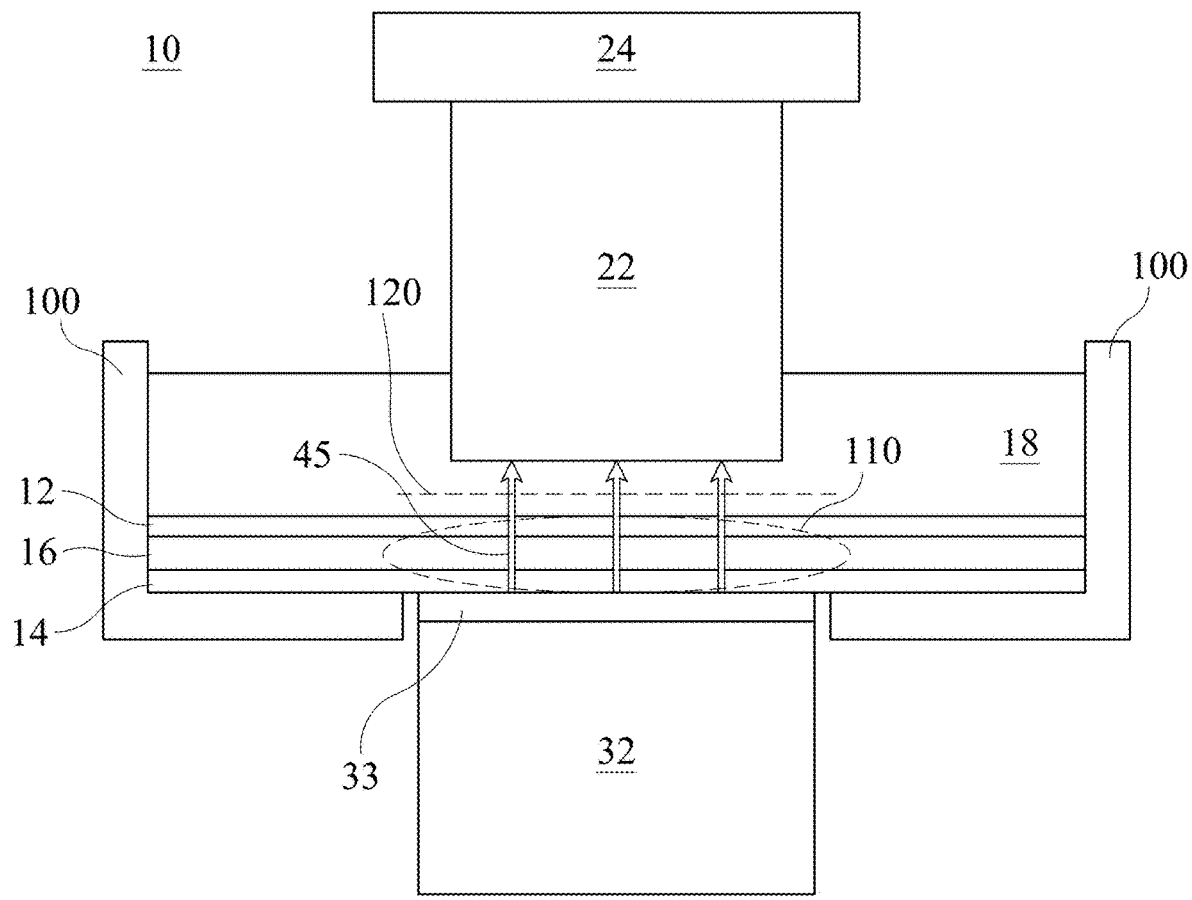
FIG. 2 shows a schematic view of a system for forming objects by photo-curing using a collimated light source and a liquid crystal display, in accordance with an embodiment of the present invention.

An example of such an arrangement is shown in FIG. 1. In this illustration, a 3D printing system 10, in which electromagnetic radiation is used to cure a photo-curing liquid polymer resin, includes a tank 100 which contains photo-curing liquid polymer resin 18. The resin 18 cures (i.e., hardens) upon being exposed to electromagnetic radiation at certain frequencies (e.g., UV light). The bottom of tank 100 may include tank window 110. In one embodiment, tank window 110 is formed by a flexible membrane 16 backed by a rigid backing member 14 (e.g., borosilicate glass), both of which are transparent to the certain frequencies of electromagnetic radiation at which curing of the photo-curing liquid polymer resin occurs, disposed over an opening in the base of the tank 100.

Light engine 32 projects electromagnetic radiation 45 (or rays thereof) through LCD panel 33 onto focal plane 120 situated within photo-curing liquid polymer resin 18 contained within tank 100. The LCD panel 33 is under computer control so as to render a representation of an image of a cross section of the object to be printed such that the light from light engine 32 passes through those portions of the LCD panel not rendered opaque to the wavelength of the incident radiation and effects photo-curing of the liquid polymer resin in the work space (focal plane 120) of the 3D printer. This arrangement affords high resolution in the x-y plane, free from optical aberrations or distortions, while preserving rapid printing speeds. As discussed below, light engine 32 projects electromagnetic radiation with rays that are collimated and have a uniform (or mostly so) intensity in an area under build plate 24 on which the 3D object 22 is formed, layer-by-layer.

More particularly, as a result of an interaction between electromagnetic radiation 45 and photo-curing agents (e.g., ultra-violet catalysts sensitive in the bandwidth of the luminous flow produced by the light engine 32) present in photo-curing liquid polymer resin 18, a cured layer of the resin forms between the bottom of a partially formed 3D object 22 and the flexible membrane 16 disposed over the bottom of tank 100. The cured layer adheres to the bottom of object 22, forming a cross section of the object, but substantially does not adhere to the flexible membrane 16 due to non-stick properties of membrane and, optionally, a lubricant layer 12 disposed on the surface of membrane 16. After the cured layer has been formed, object 22 may be raised relative to the bottom of tank 100. A height adjusting means (not depicted) may be used to raise build plate 24, which in turn raises object 22 (now with the newly formed layer included). Photo-curing liquid polymer resin 18 then flows into the gap (i.e., created by the raising of object 22) between the bottom surface of object 22 and membrane 16, and the process may be repeated for new layers of object 22 (i.e., project image, raise object, project image, raise object) until object 22 is fully formed.

As discussed above, embodiments of the present invention provide a collimated light source in the form of a light engine 32, in part through the use of a light homogenizer, in one embodiment in the form of a light pipe, and array of lenses and baffles. The collimated engine 32 may also include a polarizer, allowing LCD panel 33 to be either a conventional LCD panel with polarizing films sandwiching a liquid crystal matrix between them, or an unconventional LCD panel with only a single polarizing film at its output side.

Figure 3:
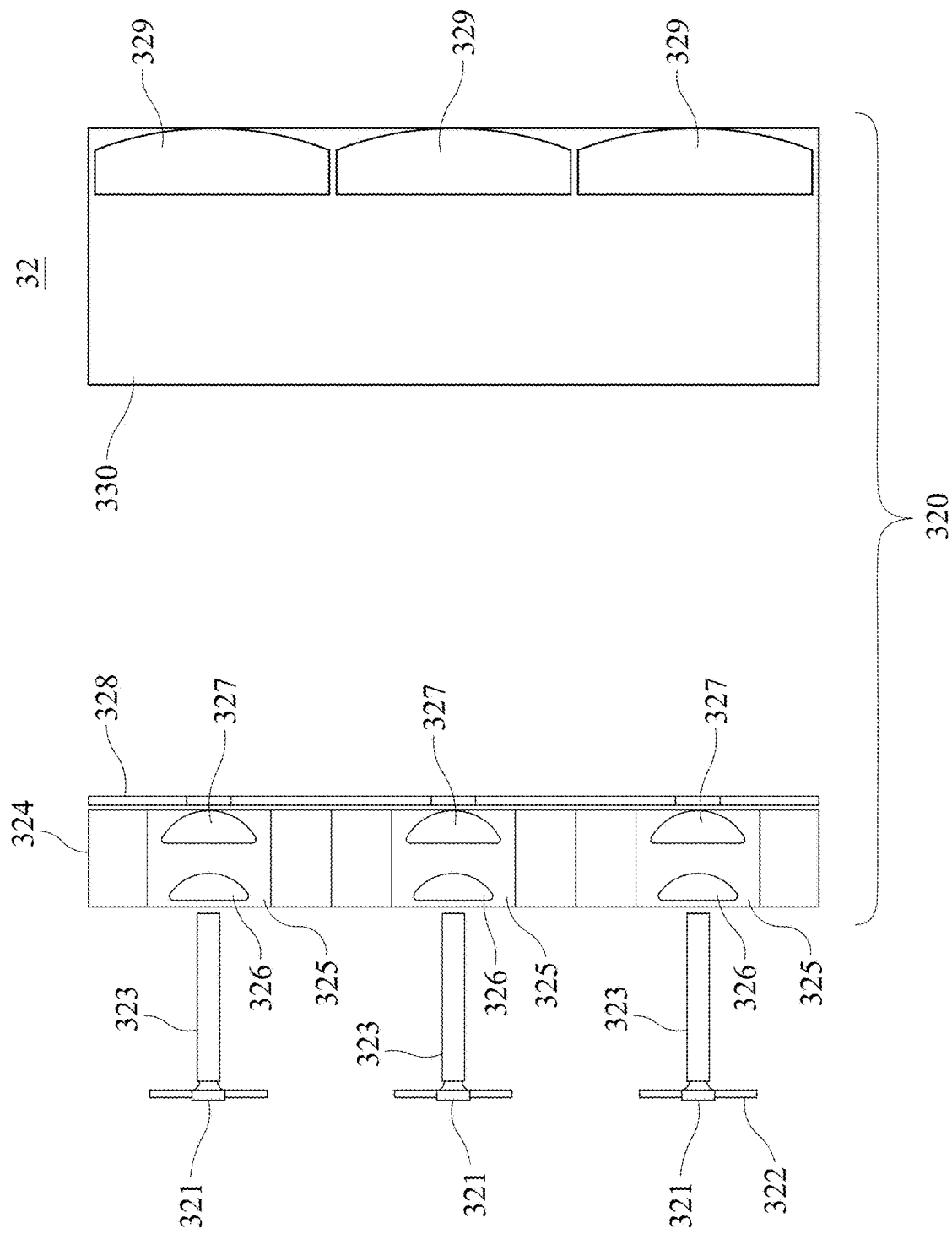
FIG. 3 shows further details of the collimated light source of the system for forming objects by photo-curing illustrated in FIG. 2.

Referring now to FIG. 3, an embodiment of light engine 32 according to one aspect of the present invention is shown. In this example, light engine 32 includes a plurality of groups of light emitting diodes (LEDs) 321. The LED groups 321 may be included on a printed circuit board (PCB) 322 or other substrate. In the illustrated view, individual PCBs 322 are shown for each group of LEDs 321, but this need not necessarily be the case in all embodiments, In practice, a single PCB may be used to host all LED groups 321, or multiple PCBs may each host a plurality of LED groups 321.

Figure 4:
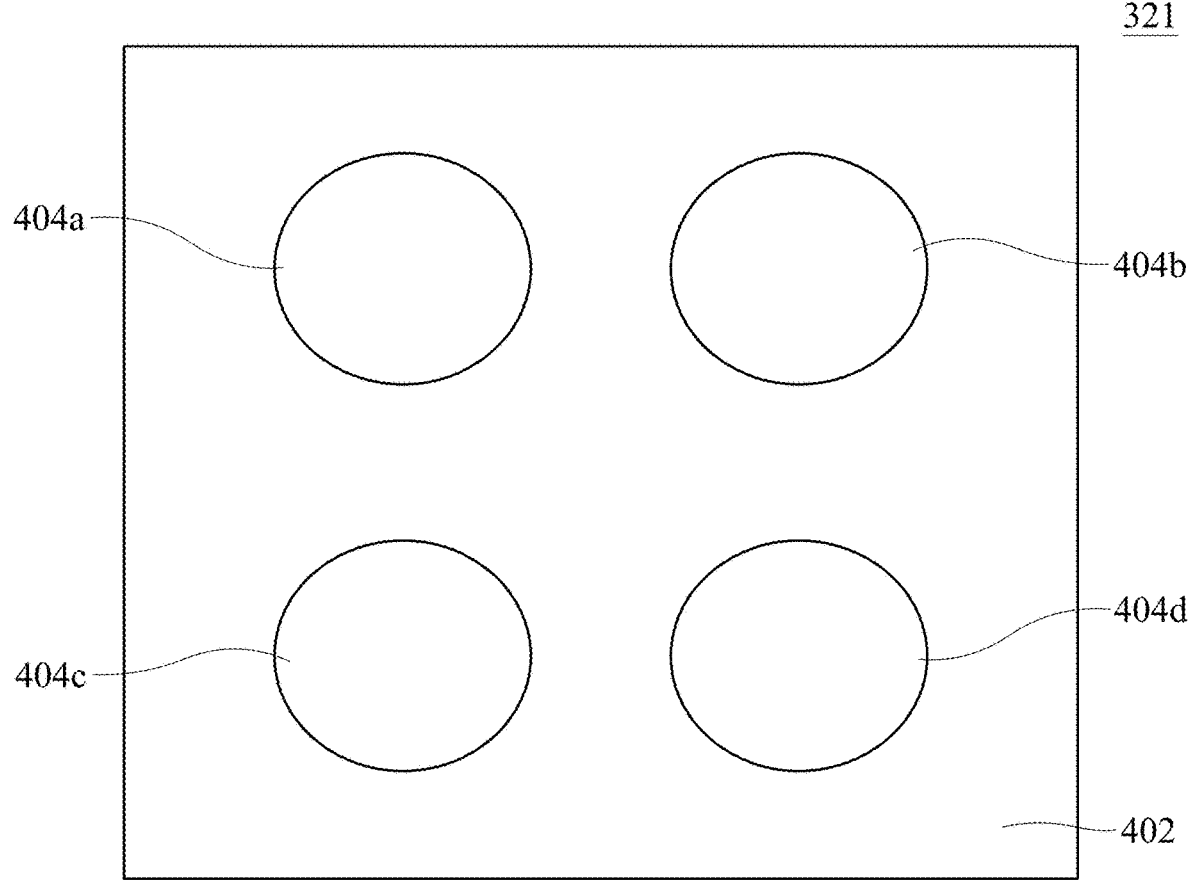
FIG. 4 shows an example of an LED group of the collimated light source of the system for forming objects by photo-curing illustrated in FIG. 3.

Referring to FIG. 4, each LED group 321 may include one or more individual LEDs. In the illustrated example, an LED group 321 includes four individual LEDs, 404a-404d mounted on an associated PCB 402. Each group of LEDs may include at least two LEDs of different wavelengths. For example, LEDs 404a and 404d may be LEDs with maximum luminosity at 405 nm and LEDs 404b and 404c may be LEDs with maximum luminosity at 385 nm. Alternatively, LEDs 404a, 404b, and 404d may be LEDs with maximum luminosity at 405 nm and LED 404c may be an LED with maximum luminosity at 385 nm. Other configurations of LEDs per group may also be used. For example, LED groups may have other numbers of LEDs at these and/or other wavelengths, for example wavelengths in the near ultra-violet, such as 365 nm. In one embodiment, each LED 404a-404d of a group of LEDs 321 may produce more than 1.4 W at 1 A, for example 1.65 W at 1 A. More generally, the LEDs of an LED group may each be capable of emitting light at one or more wavelengths of $UV_a$, $UV_b$, and $UV_c$, then, by controlling the segments of the liquid crystal matrix of the mask 33 to be transparent or not, pixels of the image projected into the tank of the 3D printer can be controlled to be one of wavelength $UV_a$, $UV_b$, or $UV_c$, or a combination of two or more thereof.

Figure 5:
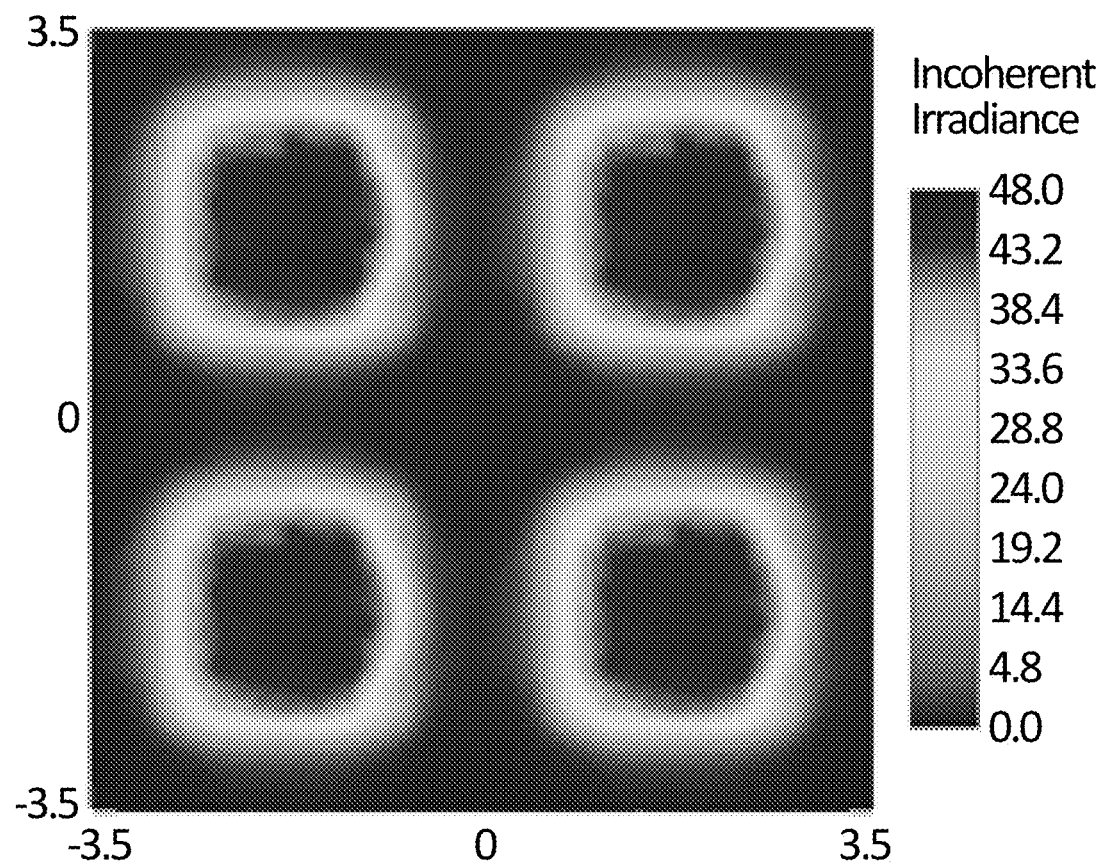
FIG. 5 is an example of a plot of incoherent irradiance of the LEDs of the LED group illustrated in FIG. 4.

FIG. 5 is an example of a plot of incoherent irradiance of the LEDs 404a-404d of LED group 321. Irradiance is a measure of the light energy of each LED 404a-404d of the group at a given surface. Incoherent irradiance is a measure of the light energy of incoherent radiation emitted by each LED of the group at a given surface. The plot indicates that the majority of the light energy of the LEDs is in the form of incoherent radiation.

Figure 6:
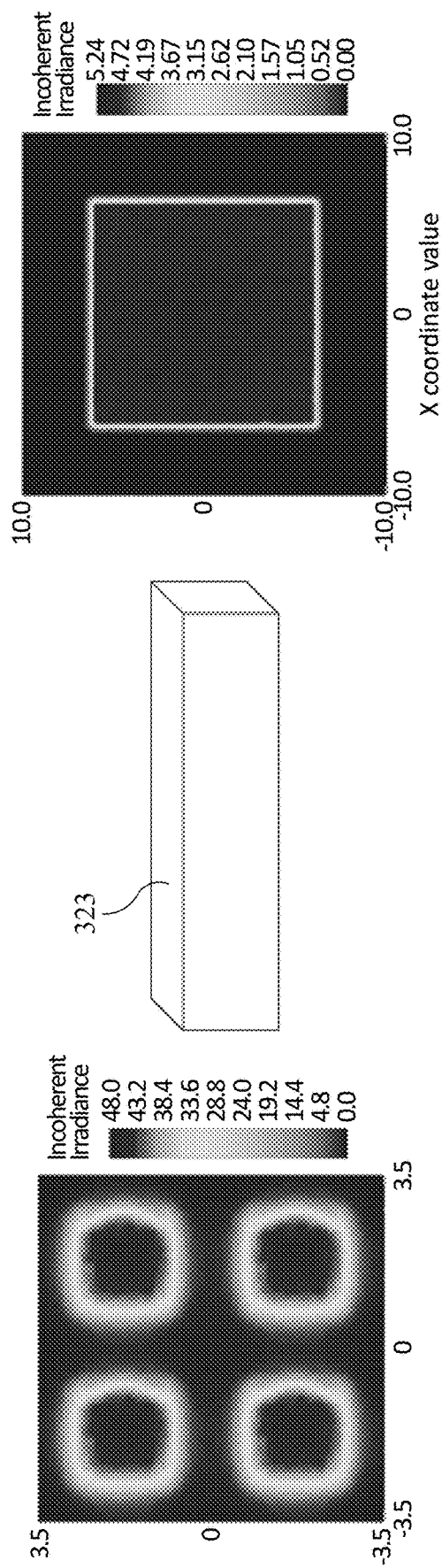
FIG. 6 illustrates the action of a light pipe of the collimated light source of the system for forming objects by photo-curing illustrated in FIG. 3, showing a plot of incoherent irradiance of four LEDs of an LED group on the left and a plot of incoherent irradiance output from the light pipe on the right.

Returning to FIG. 3, corresponding to each of the respective LED groups 321 is a respective light pipe 323. Each light pipe 323 receives the output radiation of its respective group of LEDs 321 and acts as a homogenizer for that respective group of LEDs 321, providing as a light output a highly uniform (homogenized) illumination. The light pipes may be made of an optically transparent (e.g., greater than 95% transmissivity at the wavelengths of the subject LEDs of the LED groups, e.g., 350-415 nm) material, such as fused silica, so-called "N-glass" (available, for example, from Schott A G) (e.g., NBK7), or poly(methyl methacrylate) ("PMMA"), a transparent thermoplastic. FIG. 6 illustrates the action of a light pipe 323 with a plot of incoherent irradiance of four LEDs of an LED group on the left and a plot of incoherent irradiance output from the light pipe 323 on the right. Notice that the outputs of the individual LEDs have been made highly uniform across the cross section of the light pipe 323, although the majority of the radiation output from the light pipe is still incoherent radiation. In these examples, light pipes 323 are shown as having a square cross-section, e.g., of approximately 6.5 mm per side, and may be approximately 50 mm long. However, in other embodiments, the light pipes may have other shapes, for example rectangular cross-sections, circular cross-sections, etc. and may be of different lengths.

Figure 7:
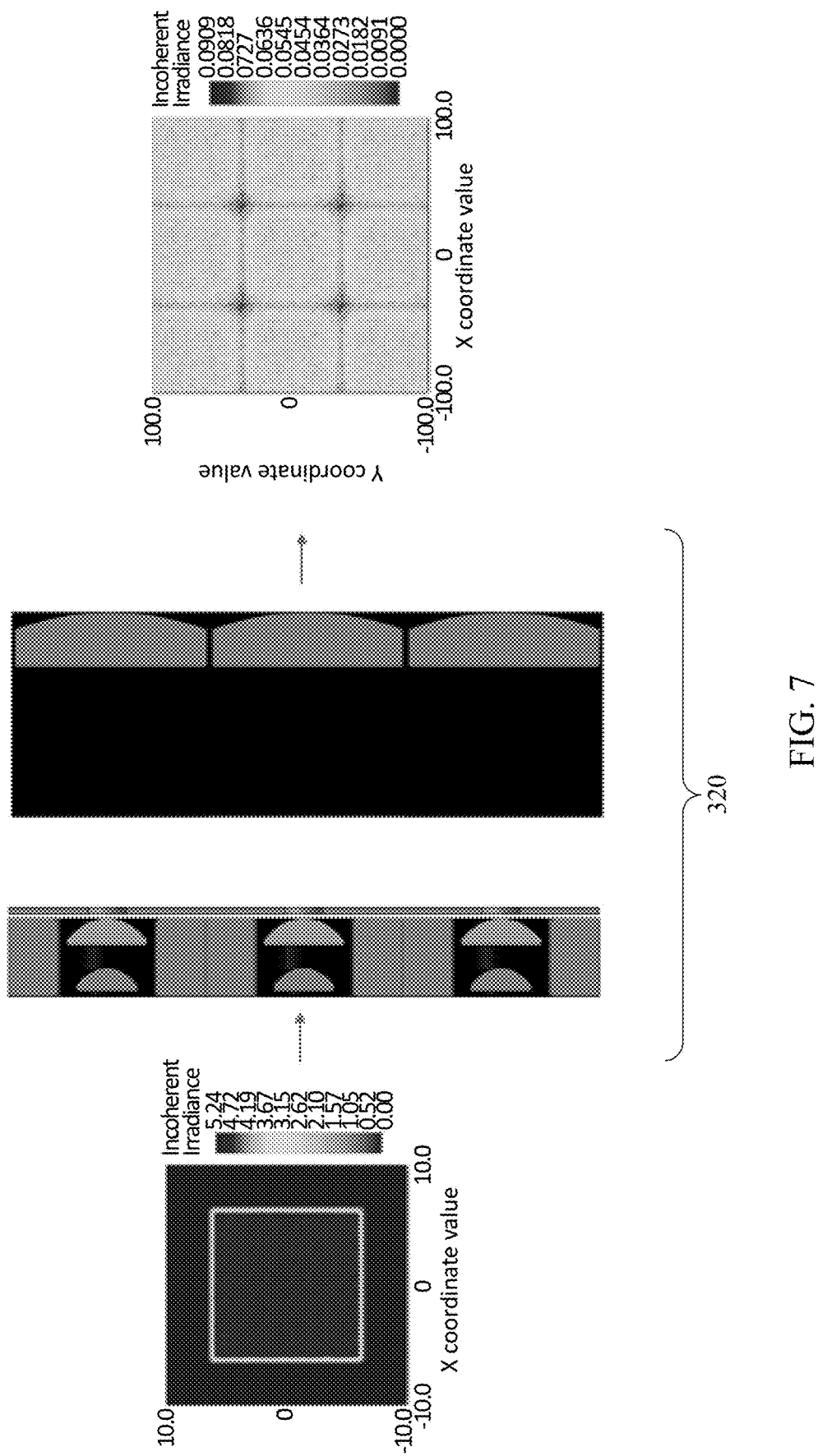
FIG. 7 illustrates an example of an output radiation pattern for a collimated light source configured in accordance with an embodiment of the present invention.

Referring again to FIG. 3, the output of each light pipe 323 is provided as an input to a telecentric optical assembly 320. The telecentric optical assembly 320 is arranged as a number of respective telecentric optical systems, one per light pipe, each of which includes a lens doublet 325 (e.g., an air spaced lens doublet), made up of a pair of lenses 326, 327, an absorber 328, an output lens 329, and a crosstalk filter 330. The lens doublets 325 may be arranged in an array in lens holder 324. In some embodiments, instead of a lens doublet, a biconvex lens may be used. Each telecentric optical system collimates the output of its respective light pipe to provide a collimated output of the respective LED group. As shown in FIG. 7, collectively, the telecentric optical systems of the telecentric optical assembly 320 provide an approximately uniform, collimated output of the light engine 32.

Figure 8:
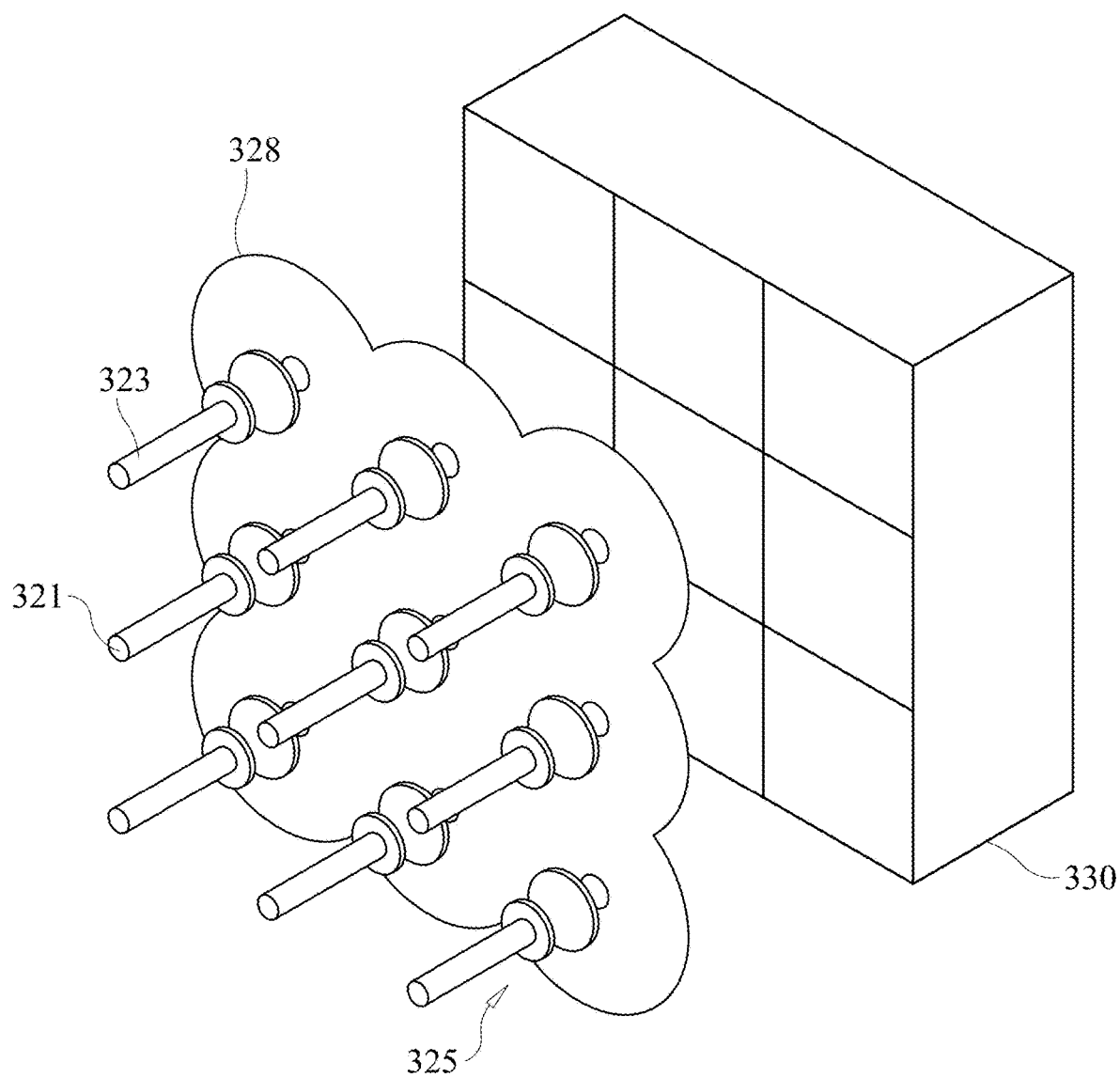
FIG. 8 shows a schematic view of the collimated light source of the present invention.

Returning to FIG. 3, each absorber 328 is configured to constrain high angle rays of electromagnetic radiation propagating from its respective light pipe 323. In essence, it is a high numerical aperture filter for each lens doublet 325. Alternatively, a variable aperture diameter may be present, for example through use of an adjustable iris. In practice, the absorbers may be fashioned from a single unit, with openings positioned for receiving the outputs of the individual lens doublets, or may be individual aperture filters. The angular output of each absorber 328 may be adjusted by changing the aperture of the absorber, e.g., using an electronically adjustable iris or similar arrangement. The crosstalk filter 330 is arranged, e.g., as an array of individual baffles, to prevent rays of electromagnetic radiation propagating between the outputs of adjacent light pipes of the light engine. The baffles may comprise opaque partition walls that prevent electromagnetic radiation from one light pipe arrangement from entering the exit lens of an adjacent light pipe arrangement. As shown in FIG. 8, the respective LED groups 321, their respective light pipes 323, and respective telecentric optical systems may be arranged in an array, for example a rectangular array, hexagonal array, circular array, or other configuration.

Figure 9:
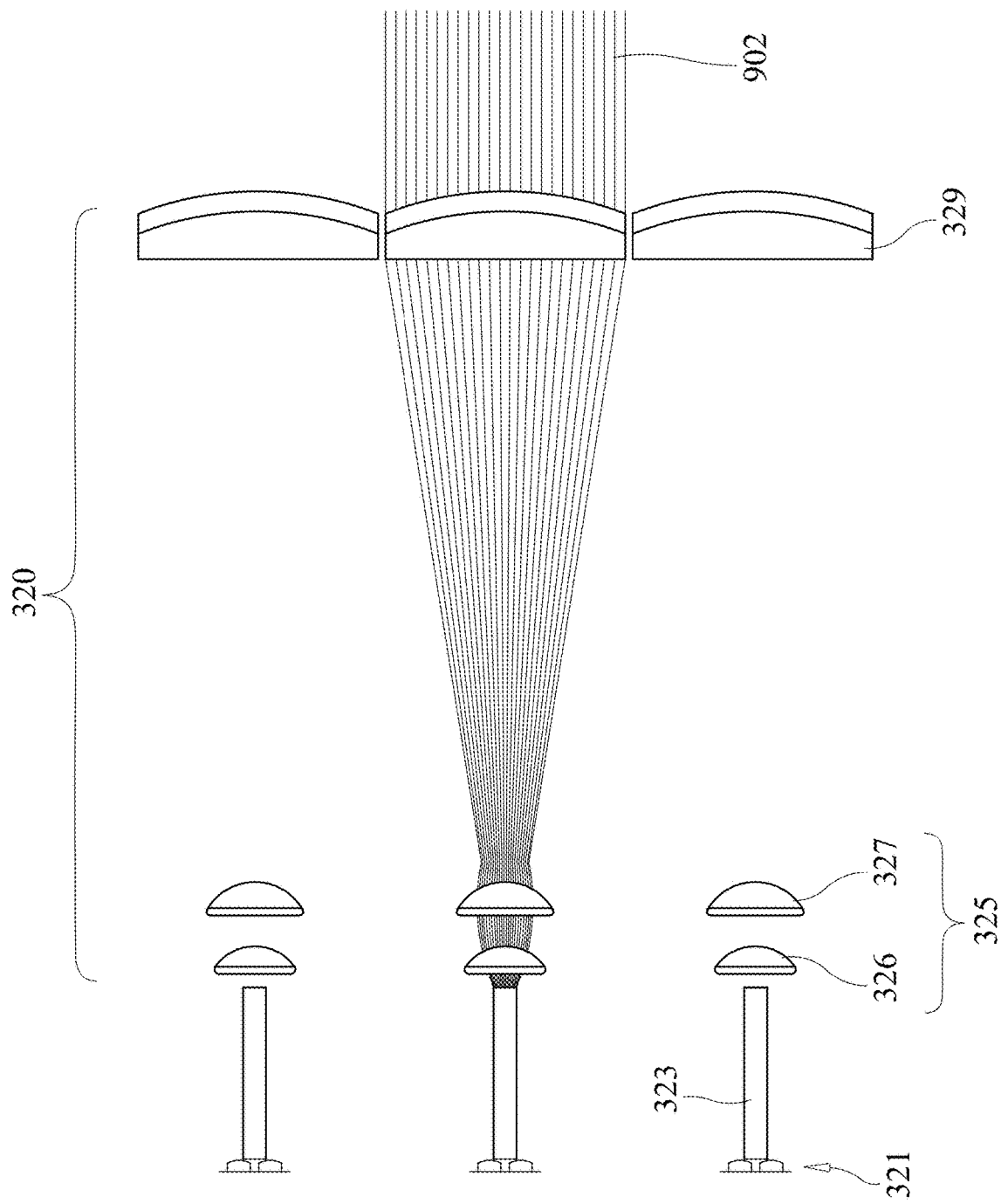
FIG. 9 shows an example of a ray tracing pattern through optical components collimated light source of the present invention.

FIG. 9 illustrates the action of the telecentric optical assembly 320, with one path of rays for one of the LED groups 321 and its respective light pipe 323 shown. Light from an LED group 321 is received and homogenized by its respective light pipe 323, the output of which is provided to a first lens 326 of each lens doublet 325. The output of each first lens 326 is passed to the respective second lens 327 of the lens doublet and then output to the output lens 329 of the respective telecentric optical system associated with the LED group 321 and light pipe 323. The absorbers and crosstalk array filter are not shown in this view. The output of the output lens 329 is a collimated beam 902. Collectively, the outputs of the individual telecentric optical systems of the telecentric optical assembly 320 is a collimated luminous flow of radiation which may be used to illuminate the LCD panel 33 of the 3D printing system 10.

The lenses of the telecentric optical assembly 320 may be made of an optically transparent material (e.g., greater than 95% transmissivity at the wavelengths of the subject LEDs of the LED groups, e.g., 370-415 nm), such as fused silica, N-glass, or PMMA. The first lens 326 and second lens 337 of each lens doublet 325 may each be a plano-convex, circular-shaped lens having a convex upper surface, planar bottom surface, and planar side surface. Each output lens 329 may be a plano-convex, square-shaped lens having a convex upper surface, planar bottom surface, and four planar side surfaces. Alternatively, a lens array may be used instead of a square lens. Or, in some embodiments, a Fresnel lens may be used.

Figure 10:
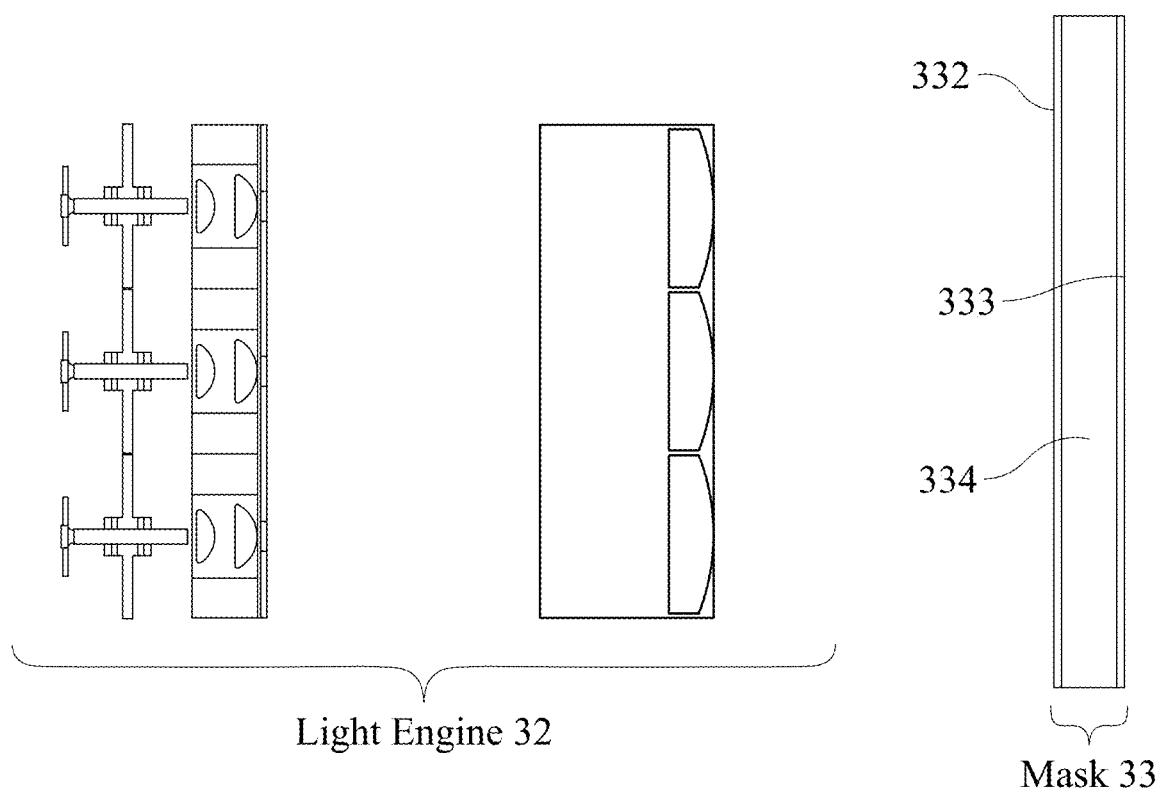
FIGS. 10-13 illustrates various examples of polarizer arrangements for a light engine and mask in accordance with embodiments of the present invention.

Referring now to FIG. 10, an example of the light engine 32 and mask 33 are shown. In this example, mask 33 includes a pixelated liquid crystal layer 334 sandwiched between polarizing layers 332, 333. That is, the mask includes polarizing films on each side of the LCD panel. Unlike conventional polarizing layers for LCD panels, however, in embodiments of the present invention the polarizing layers 332, 333 for mask 33 are adapted to be more transmissive at wavelengths of the LEDs of the light engine 32. For example, the polarizing layers 332, 333 may have transmissivity of greater than or equal to 30% at wavelengths between 370-430 nm.

Figure 11:
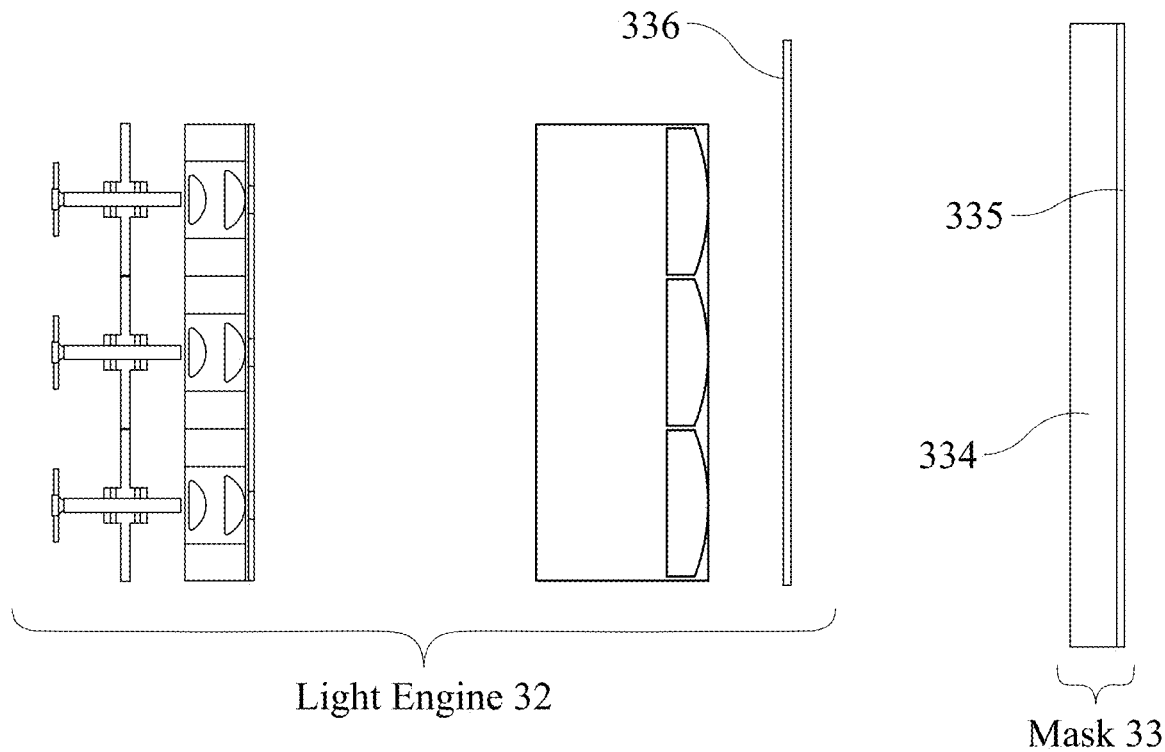

FIG. 11 illustrates an alternative example of the light engine 32 and mask 33 for an embodiment of the present invention. In this example, mask 33 includes pixelated liquid crystal layer 334 but only a single polarizing layer 335 at the output side of the LCD panel. This polarizing layer 335 may be a conventional polarizing layer or a polarizing layer with enhanced transmissivity, as for polarizing layers 332, 333. In this embodiment, a polarizing layer 336 is introduced as part of light engine 32 at the output of the telecentric optical assembly. One advantage to positioning the polarizing layer 336 in the light engine 32 is that the light incident on the mask 33 will now be polarized, thus providing enhanced transmissivity of the incident light through the LCD panel and reduced heat generation from the polarizing layer of an LCD panel blocking incident light. The reduction in heat produced at the LCD panel (mask 33) is expected to increase the useful life of the mask. Heat will still be generated at the polarizing layer 336, but as this polarizing layer is internal to the light engine, the heat will be dissipated by existing cooling arrangement for the light engine. Such cooling arrangements may be forced air cooling (e.g., using one or more fans), liquid cooling (e.g., using a radiator or similar cooling arrangement), or a combination of the two. Because a cooling system for the LEDs of the light engine is already required, little or no cost increase of such a system is expected in order to accommodate the heat load of polarizing layer 336.

Figure 12:
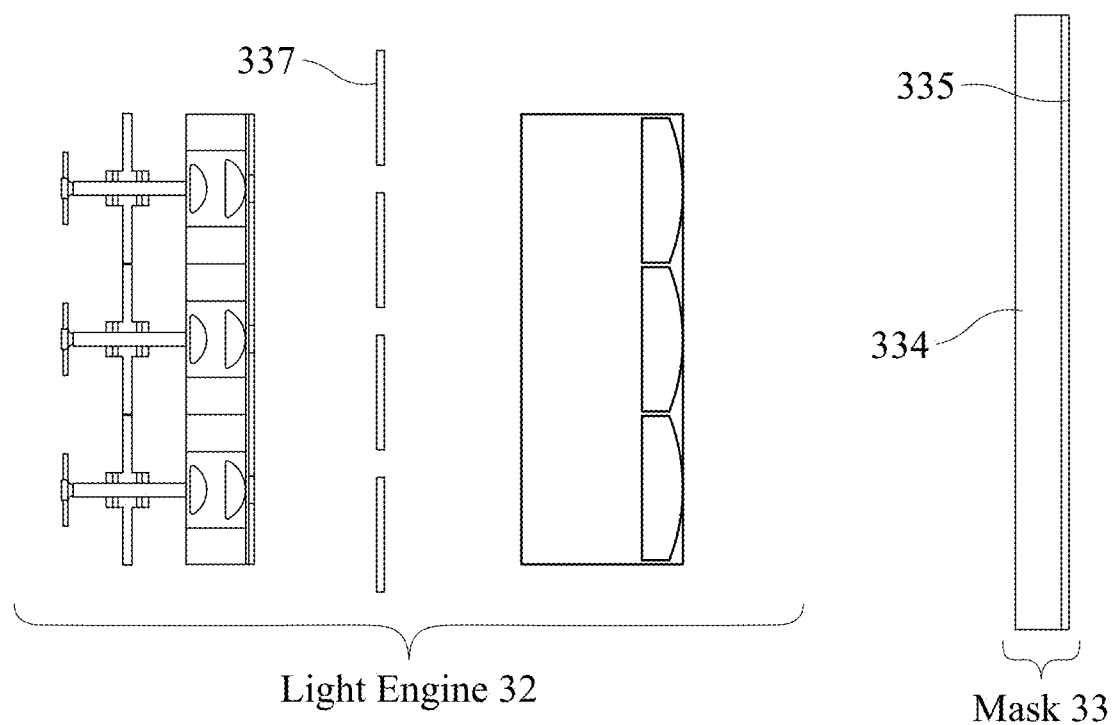

FIG. 12 presents a further alternative embodiment of the light engine 32 and mask 33. In this example, mask 33 includes pixelated liquid crystal layer 334 and a single polarizing layer 335 at the output side of the LCD panel. This polarizing layer 335 may be a conventional polarizing layer or a polarizing layer with enhanced transmissivity, as for polarizing layers 332, 333. In this embodiment, a polarizer 337 is introduced as part of light engine 32 at a location intermediate the lens assemblies of the telecentric optical assembly. Polarizer 337 may be a wire grid polarizer positioned between the output of the lens doublets and inputs of the output lenses telecentric optical assembly of light engine 32. In some instances, individual wire grid polarizers may be used per respective telecentric optical system of the telecentric optical system. As with the embodiment illustrated in FIG. 11, the use of such wire grid polarizers intermediate the lens assemblies of the telecentric optical assembly provides enhanced transmissivity of the incident light through the LCD panel and reduced heat generation from the polarizing layer of an LCD panel blocking incident light inasmuch as the light produced by the light engine 32 is now polarized in addition to be collimated. Again, the increase in heat in the light engine 32 as a result of the presence of polarizer(s) 337 can be accommodated through the use of a forced air and/or liquid cooled cooling system.

Figure 13:
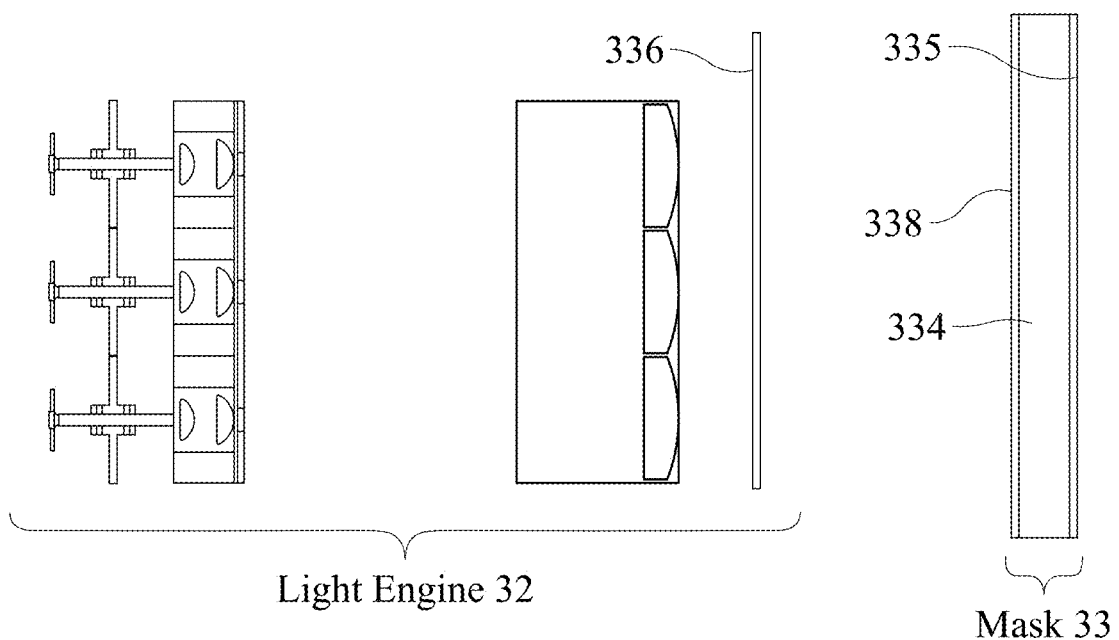

FIG. 13 illustrates yet a further example of the light engine 32 and mask 33 for an embodiment of the present invention. In this example, mask 33 includes pixelated liquid crystal layer 334 sandwiched between polarizing layers 335, 338. Polarizing layers 335, 338 may be conventional polarizing layers or polarizing layers with enhanced transmissivity. In this embodiment, similar to that shown in FIG. 11, a polarizing layer 336 is introduced as part of light engine 32 at the output of the telecentric optical assembly, hence the advantages attendant to the FIG. 11 embodiment discussed above are also present here. The polarization imparted by polarizing layer 336 is complementary to the polarization of polarizing layer 338 at the input of mask 33 so as to minimize any blocking of incident light by polarizing layer 338. Similar cooling arrangements for light engine 32 as discussed for the FIG. 11 embodiment may be used with this FIG. 13 embodiment.

Thus, light engines for use in 3D printing apparatus that rely on photo-curing of liquid polymers for the formation of 3D objects have been described. The light engines of the present invention provide a collimated luminous flow of radiation, at one or more wavelengths, through an LCD panel mask to produce an image at a working area of a vat polymerization 3D printer. The various wavelengths of light for the LED sources may be selected so as to permit the use of different additives in a polymer resin from which the 3D article under fabrication will be formed. Many photo-curable polymers of the type used for 3D printing cure in the UV band. By introducing curing agents that are sensitive at different wavelengths, different structural characteristics of the object under fabrication can be achieved by filtering the incident radiation appropriately. For example, some curing agents may be sensitive at a wavelength $UV_a$, while others are sensitive at a wavelength $UV_b$. By maintaining suitably selective LEDs, and selectively passing or not passing light at wavelengths UV a and/or $UV_b$ through pixels of LCD panel in the manner described above, the different curing agents can be activated (or not) on a near per-pixel basis (inasmuch as the curing will occur almost immediately adjacent the top surface of the LCD panel and therefore beam divergence can be expected to be a minimum) at the interface of the flexible membrane with the polymer resin. In still further embodiments, LEDs that emit light across broad spectrums of visible and UV wavelengths, or that emit light at multiple, discrete wavelengths in each band, may be used. In such examples, the color of a fabricated object at various pixels may be controlled by passing light of an appropriate wavelength through the LCD panel so as to activate a color agent (pigment) within the resin at points of which it is being cured.

What is claimed is:

1. A light engine for a three-dimensional printer, the light engine comprising:
   a plurality of light emitting diodes (LEDs) arranged into respective groups of the LEDs, each respective group of the LEDs including at least one LED; and, corresponding to each of the respective LED groups,
   (i) a respective light pipe for receiving outputs of radiation from each LED of the respective group and providing an output of the light pipe, and
   (ii) a respective telecentric optical system for collimating the output of the respective light pipe to provide a collimated output of the respective LED group, the respective telecentric optical system including a plurality of lenses, an absorber configured to constrain high angle rays of electromagnetic radiation propagating from the respective light pipe, and a crosstalk filter arranged to prevent rays of electromagnetic radiation propagating from one or more adjacent ones of the respective light pipes of the light engine through the telecentric optical system associated with the respective light pipe,
   wherein the respective LED groups, their respective light pipes, and their respective telecentric optical systems are arranged in an array.

2. The light engine of claim 1, wherein each of the respective LED groups includes at least two LEDs of different wavelengths.

3. The light engine of claim 1, wherein each of the respective LED groups includes four LEDs.

4. The light engine of claim 3, wherein the four LEDs of each of the respective LED groups include one of: one or more LEDs that emit electromagnetic radiation at 405 nm or one or more LEDs that emit electromagnetic radiation at 385 nm.

5. The light engine of claim 3, wherein the four LEDs of each of the respective LED groups include one or more LEDs that emit electromagnetic radiation at 405 nm and one or more LEDs that emit electromagnetic radiation at 385 nm.

6. The light engine of claim 3, wherein the four LEDs of each of the respective LED groups are independently operable to emit electromagnetic radiation.

7. The light engine of claim 1, further comprising a polarizer positioned to receive the collimated output of the respective telecentric optical system of each of the respective LED groups.

8. The light engine of claim 1, further comprising a polarizer positioned intermediate the plurality of lenses of the respective telecentric optical system of each of the respective LED groups.

9. The light engine of claim 1, wherein the absorber of the telecentric optical system of each of the respective LED groups has an adjustable numerical aperture.

10. The light engine of claim 1, wherein the respective light pipe of each of the respective LED groups is made of one of: fused silica, N-glass, poly(methyl methacrylate), or a transparent thermoplastic.

11. The light engine of claim 1, wherein the plurality of lenses of the telecentric optical system of each of the respective LED groups includes three lenses, two of the three lenses forming a lens doublet and one of the three lenses being a square lens.

12. An apparatus for forming three-dimensional objects by photo-curing a photo-curing liquid polymer by exposure to radiation, the apparatus comprising:
   a tank for containing the photo-curing liquid polymer, a mask, and a collimated light source to emit said radiation by which said photo-curing liquid polymer undergoes curing through a radiation-transparent opening in said tank, wherein said mask is positioned between said collimated light source and photo-curing liquid polymer and said collimated light source comprises:
   a plurality of light emitting diodes (LEDs) arranged into respective groups of the LEDs, each respective group of the LEDs including at least one LED; and, corresponding to each of the respective LED groups,
   (i) a respective light pipe for receiving outputs of radiation from each LED of the respective group and providing an output of the light pipe, and
   (ii) a respective telecentric optical system for collimating the output of the respective light pipe to provide a collimated output of the respective LED group towards the mask, the respective telecentric optical system including a plurality of lenses, an absorber configured to constrain high angle rays of electromagnetic radiation propagating from the respective light pipe, and a crosstalk filter arranged to prevent rays of electromagnetic radiation propagating from one or more adjacent ones of the respective light pipes of the light source through the telecentric optical system associated with the respective light pipe,
   wherein the respective LED groups, their respective light pipes, and their respective telecentric optical systems are arranged in an array.

13. The apparatus of claim 12, wherein the mask comprises a liquid crystal display (LCD) panel configured to selectively transmit electromagnetic radiation from the collimated light source into the tank through the radiation transparent opening in said tank.

14. The apparatus of claim 13, wherein the mask includes polarizing films on each side of the LCD panel.

15. The apparatus of claim 13, wherein the mask includes a polarizing film on only one side of the LCD panel.

16. The apparatus of claim 13, wherein each of the respective LED groups includes four LEDs.

17. The apparatus of claim 16, wherein the four LEDs of each of the respective LED groups include one or more LEDs that emit electromagnetic radiation at 405 nm.

18. The apparatus of claim 16, wherein the four LEDs of each of the respective LED groups include one or more LEDs that emit electromagnetic radiation at 385 nm.

19. The apparatus of claim 16, wherein the four LEDs of each of the respective LED groups include one or more LEDs that emit electromagnetic radiation at 405 nm and one or more LEDs that emit electromagnetic radiation at 385 nm.

20. The apparatus of claim 13, wherein the collimated light source further comprises a polarizer positioned either to receive the collimated output of the respective telecentric optical system of each of the respective LED groups or intermediate the plurality of lenses of the respective telecentric optical system of each of the respective LED groups.

* * * * *